US010402920B2

(12) United States Patent
Fox

(10) Patent No.: US 10,402,920 B2
(45) Date of Patent: Sep. 3, 2019

(54) ORDER MANAGEMENT SYSTEM AND PROCESS FOR DRIVE-THROUGH AND PICKUP WINDOW RESTAURANTS

(71) Applicant: David C. Fox, Colege Station, TX (US)

(72) Inventor: David C. Fox, Colege Station, TX (US)

( * ) Notice: Subject to any disclaimer, the term of this patent is extended or adjusted under 35 U.S.C. 154(b) by 385 days.

(21) Appl. No.: 15/168,952

(22) Filed: May 31, 2016

(65) Prior Publication Data

US 2017/0018041 A1 Jan. 19, 2017

Related U.S. Application Data

(60) Provisional application No. 62/191,772, filed on Jul. 13, 2015.

(51) Int. Cl.

| | |
|---|---|
| ***G06Q 50/12*** | (2012.01) |
| ***G06Q 20/32*** | (2012.01) |
| ***G06Q 10/02*** | (2012.01) |

(52) U.S. Cl.

CPC ............ *G06Q 50/12* (2013.01); *G06Q 10/02* (2013.01); *G06Q 20/3224* (2013.01)

(58) Field of Classification Search

USPC .......................................................... 705/15

See application file for complete search history.

(56) References Cited

U.S. PATENT DOCUMENTS

2014/0100971 A1* 4/2014 Klearman .......... G06Q 30/0641 705/15

2016/0244311 A1* 8/2016 Burks ................. B67D 1/0888

* cited by examiner

*Primary Examiner* — Garcia Ade

(74) *Attorney, Agent, or Firm* — Douglas Baldwin; Timothy D. Snowden

(57) ABSTRACT

A system and process for a causal dining drive-through restaurant ordering and order pick-up that displays order status to customers (guests) and eliminates sequential order pickup thus minimizing unnecessary wait time. Other features includes providing and displaying real time order status, optional display panels, means for acquisition of order and customer data for inventory control, automatic accounting and customer data entry for promotion and advertising.

21 Claims, 6 Drawing Sheets

102
Display Menu/Ordering
104
Display order ID; Items ordered preparation time
106
108
Customer pays
114
Status feedback to customer
110
Data Processing Unit
116
Optional Display Board
124
Accounting Module
112
Order to customer
118
Order ready
120
Customer pickup 222
228
221
224
212
206
215
202
220
214
204
218
208
226

ORDER MANAGEMENT SYSTEM AND PROCESS FOR DRIVE-THROUGH AND PICKUP WINDOW RESTAURANTS

CROSS REFERENCE TO RELATED APPLICATIONS

This application claims benefit of Provisional Patent Application Ser. No. 62/191,772 filed Jul. 13, 2015, the contents and disclosures of which are incorporated herein by reference in their entirety for all purposes.

BACKGROUND

Field of Invention

This invention relates to drive-through, pick-up and delivery ordering and delivery systems and processes for restaurants.

Background

For fast casual and casual dining restaurants where customers pick up ordered food from a delivery or pick-up window, time is of special importance. Customers do not wish to wait. However, for many restaurants the preparation time significantly varies between menu items and order completion time is determined by multiple dynamic variables: staffing levels, staff position training, staff skill levels, prior orders in progress, inventory on hand, order size, order complexity and by the longest preparation time of any one item on an order. In customary drive-through restaurants customers are served in the sequence of order placement or arrival at the restaurant order queue (a linear queue) so there can be a significant wait in a queue for delivery of an order even if the preparation time is short because the delivery is made in the sequence of orders received; not when the orders are ready for pick-up. This results from the arrangement of drive-through parking lots with sequential drive lanes. Moreover, considerable time is spent in payment at the pick-up window.

The present inventive process and system solves those time wasting problems and allows customers the convenience of a drive through window while being served a higher quality menu (typically found in fast casual and casual restaurants) requiring longer food preparation times and allows customers to receive a more reliable expectation of order completion.

BRIEF DESCRIPTION OF DRAWINGS

FIG. 2B FIG. 2A is a schematic view of a possible mobile device display of an embodiment of the invention after editing an order.

DETAILED DESCRIPTION

This invention is, in one embodiment, an ordering system and process for a causal dining drive-through restaurant ordering and order pick-up that displays order status to customers (guests) and eliminates sequential order pickup thus minimizing unnecessary wait time. Other features includes providing and displaying real time order status, optional display panels, means for acquisition of order and customer data for inventory control, automatic accounting and customer data entry for promotion and advertising. The system and process also allows for the management of a combination of pick-up and delivery orders. The system, in one embodiment, provides a location layout embodiment to expedite ordering and non-sequential order pickup.

Figure 1:
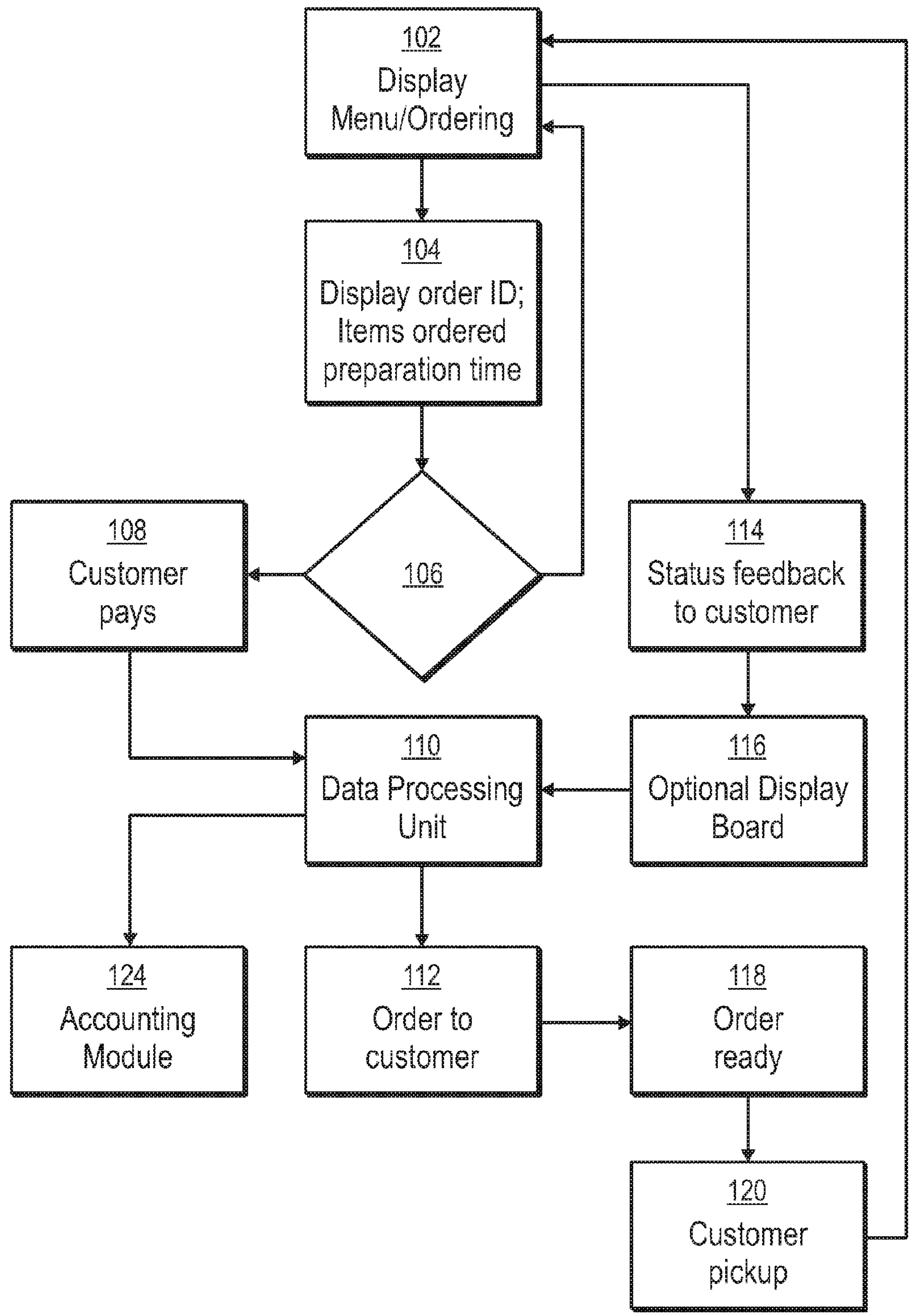
FIG. 1 is a flow diagram of the process of an embodiment of the invention.

Referring to FIG. 1, the process starts at 102 where customers access a menu of available items. The menu will generally be available on an interactive website or mobile application (App) that can be accessed by customer through his/her mobile device (cell phone, computer tablet, computer and the like). Customers (Guests) can place orders from anywhere—allowing them to plan ahead and pickup later. This allows other occupants in a vehicle to place the pickup order while the vehicle is moving towards the restaurant. The menu display also includes means for the customer to indicate the desired pickup wait time ((for example: as soon as possible (ASAP), 10 minutes, tomorrow, etc.)).

Figure 2B:
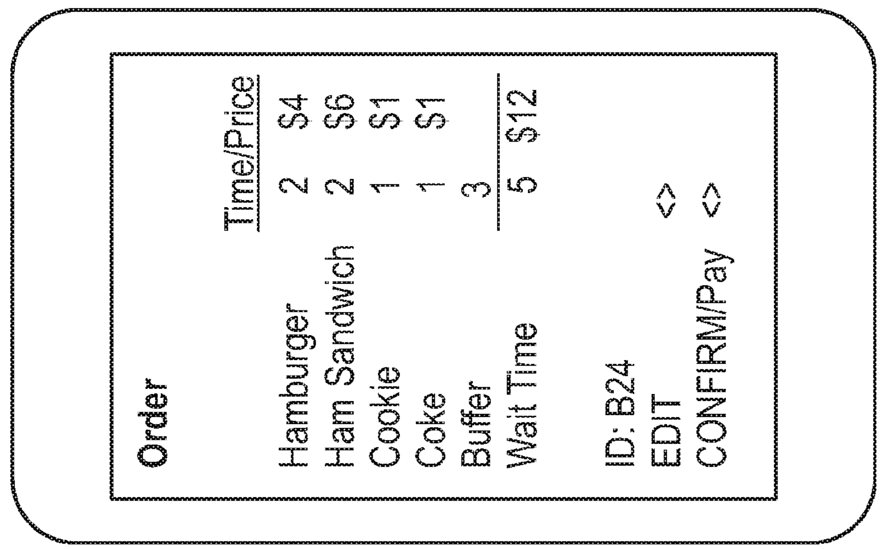
Figure 2A:
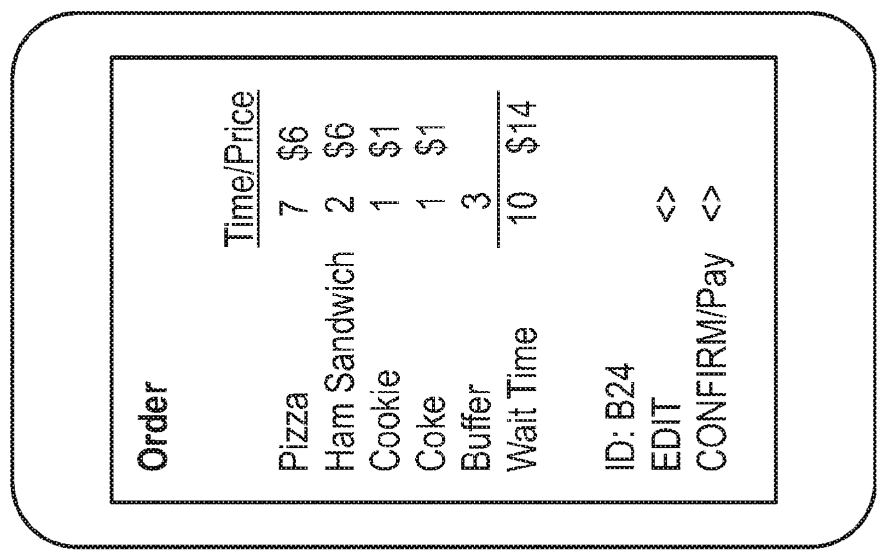
FIG. 2A is a schematic view of a possible mobile device display of an embodiment of the invention before editing an order.
Figure 2D:
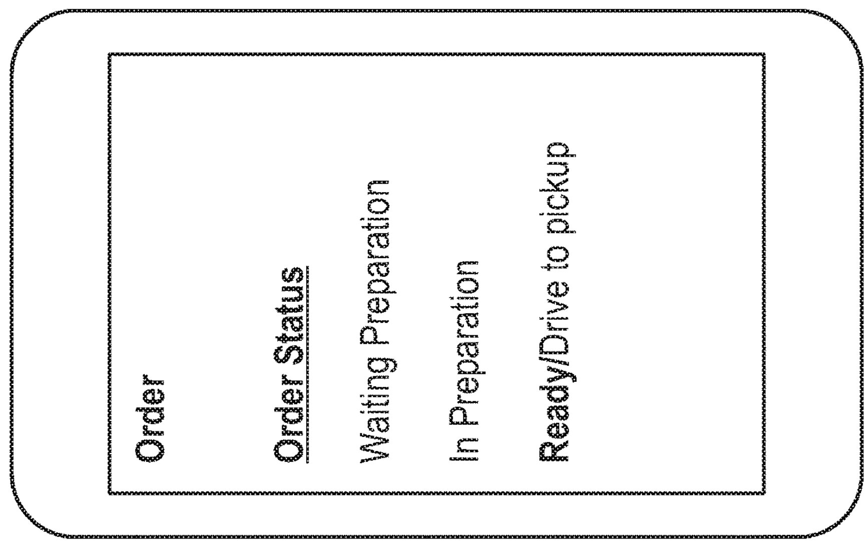
FIG. 2D is a schematic view of a possible mobile device display of an embodiment of the invention showing status of an order.
Figure 2C:
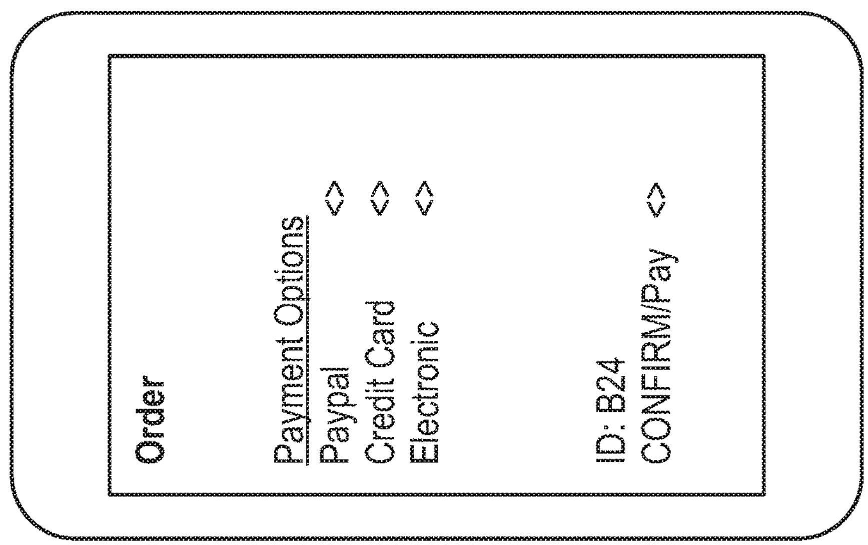
FIG. 2C is a schematic view of a possible mobile device display of an embodiment of the invention showing payment options.

When the customer accesses the menu a customer identification (ID) is generated by a data processing unit or the customer uses an existing unique identification number or code. When the customer selects items from the menu for orders that are wanted as soon as possible (ASAP) there is generated and displayed on the customer's mobile device or computer the menu items selected, the price and the preparation time for each item and the preparation time plus indicated wait time as illustrated in FIGS. 2A and 2B. Thus, the customer can see (104 display on customer's mobile device, FIG. 2A—or appropriate computer screen) if the preparation for one or more items is excessive for his or her needs and can edit the order accordingly. The system data processor(s) will calculate all the variables. If a particular item on the order could be deleted and allow the order to be produced more quickly, then the system will highlight that item and inform the customer how much time could be "saved" by not ordering that particular item. If no item can be deleted to save preparation time, then no indication will be displayed. The display may also display an appropriate message such as "Your Order's Wait Time will be X minutes. To shorten your Wait Time, remove the highlighted item(s) below." The display may also show "Promised Time". For example, preparation time for pizza a may be 7 minutes and all other items (drinks, sandwiches bagged chips and the like only 1-2 minutes as illustrated in a mock mobile device display in FIG. 2A. Thus the customer may edit the order, for example, delete pizza, and select another item with shorter preparation time (see 106 to 102 of FIG. 1) where pizza is deleted and hamburger is selected. The order is confirmed or edited. If edited (as illustrated on FIG. 2B) it may then be confirmed. When confirmed, 106 (decision connector) to 108 (customer payment module), the order and cost is displayed (FIG. 2C) and the customer is asked to make required payment as illustrated in FIG. 2C. The order status will be periodically or continuously updated (FIG. 2D). There will also be an indication on the customer's device screen that the "order is ready". For future planned orders where a customer selects a specific time slot and day, the system will determine whether or not the order can be produced (and delivered) by the time requested and so inform the customer on its device screen. No production times will be displayed When the customer selects items from the menu there is generated and displayed on the customer's mobile device or computer the menu items selected, the price and the indicated total wait time. Also displayed next to any one item in the order is the amount of wait time that could be removed from the total wait time by removing that one item (which has a longer production time associated with it) from the order. Thus, the customer can see (104 display on customer's mobile device, FIG. 2A) if the preparation for one or more items is excessive for his or her needs and can edit the order accordingly. For future "planned" orders the customer selects a specific time slot and day. The system will determine whether or not the order can be produced (and delivered on time) by the time requested. In this scenario, no production times will be displayed because they do not matter.

As noted above there is also optionally provided means for customers to enter a unique customer identification number or code upon placing an order (signing in to an account). This identification number or code will facilitate speedier service and allow identification of repeat and frequent customers. Customer's payment types, past orders and favorites are remembered by the system thus making reorder quicker and more convenient compared to traditional drive thru windows.

The wait time for as soon as possible (ASAP) orders and time slots allowed for future orders is based on an algorithm that factors multiple variables. Variables include (but are not limited to):

a. ASAP or promised time(s) of prior orders and the current production progress of each of those prior orders b. Order size c. Order item complexity d. Production staff levels e. Delivery staff levels f. Skill levels of staff members g. Delivery distance of prior and current orders The system, with a customer identification can optionally be programmed to allow frequent, loyal, VIP guests to jump ahead of the line and for their order to receive preferential timing. The system may also be configured to allow guests to pay an extra fee to receive their order quicker. It can also allow for a "Free if Late" promotion and other promotions.

The system contains a management tool for measuring and tracking promised times versus actual fulfilled delivery and pickup times.

In general, only electronic payment from a customer's mobile or computer device connected by the internet (or other distributive computing method) is accepted as payment. There are many mobile payment systems available and more are being developed all the time. These include Square Wallet, Virtual Prepaid cards, Google Pay, Apple Passbook, Lemon Wallet, Softcard, Dwolla and the like. Optionally, there may be provided a kiosk at the restaurant location for payment by credit card or cash. Also, optionally, there will be provided a customer service representative (order taker) in the location parking lot that will have a mobile device for taking orders and payments.

In addition to displaying the menu or ordered items there is provided, in one embodiment, an interactive sensor (usually a button) on the menu display on the customer's mobile device or computer that will allow nutritional information for the menu or ordered items to be displayed. The nutritional information may also contain various diet "points" such as used by diet services as for example, Weight Watchers™, Jenny Craig™, NutriSystem™ and the like. The information is stored in data storage in the Data Processing Unit or other suitable accessible data storage and accessed by the appropriate computer program of the computer system.

Kitchen orders are prepared by the preparation staff in parallel, not necessarily in linear sequence, as determined and arranged by an algorithm of the data processing unit. The system algorithm determines which order to make next and dictates promised completion times. Simple orders and preferred guests' orders are moved forward in progression. Multiple orders are worked simultaneously. When orders are complete, the customer is notified and the order preparation algorithm is updated to calculate a new preparation display for the preparation kitchen staff.

When the order is ready the customer is notified (112) (FIG. 2D) by visual display (FIG. 2D) or text message on his/her mobile device or computer or by any other suitable means and the customer moves to an order pick-up window, 120. An order placed for delivery also receives a text message on his/her mobile device or computer or by any other suitable means to notify them that a delivery driver has departed from the restaurant with their order and gives them an updated arrival time based on current traffic conditions available on various internet sites. Thus, there is no sequential waiting for order pickup—the order is picked up when ready and since the order is prepaid no wait for payment and change making. This is facilitated by the arrangement of the location physical layout explained in more detail below.

The data processing unit or module, 110, is the computing and data generation heart of the system. It contains suitable data storage capacity for menu items, prices, preparation time, customer identification, order details, payment details and the like. It is capable of computing preparation wait time and pre-preparation times from inputted and stored data and causing the resulting information to be displayed on customers' devices and display panels (116), for customers and preparation personnel.

The data processing unit and associated data storage will suitably be a computer programmed and running software to perform the functions described. Design and implementation of such a data processing system is well within the capabilities of those skilled in the art.

Figure 3:
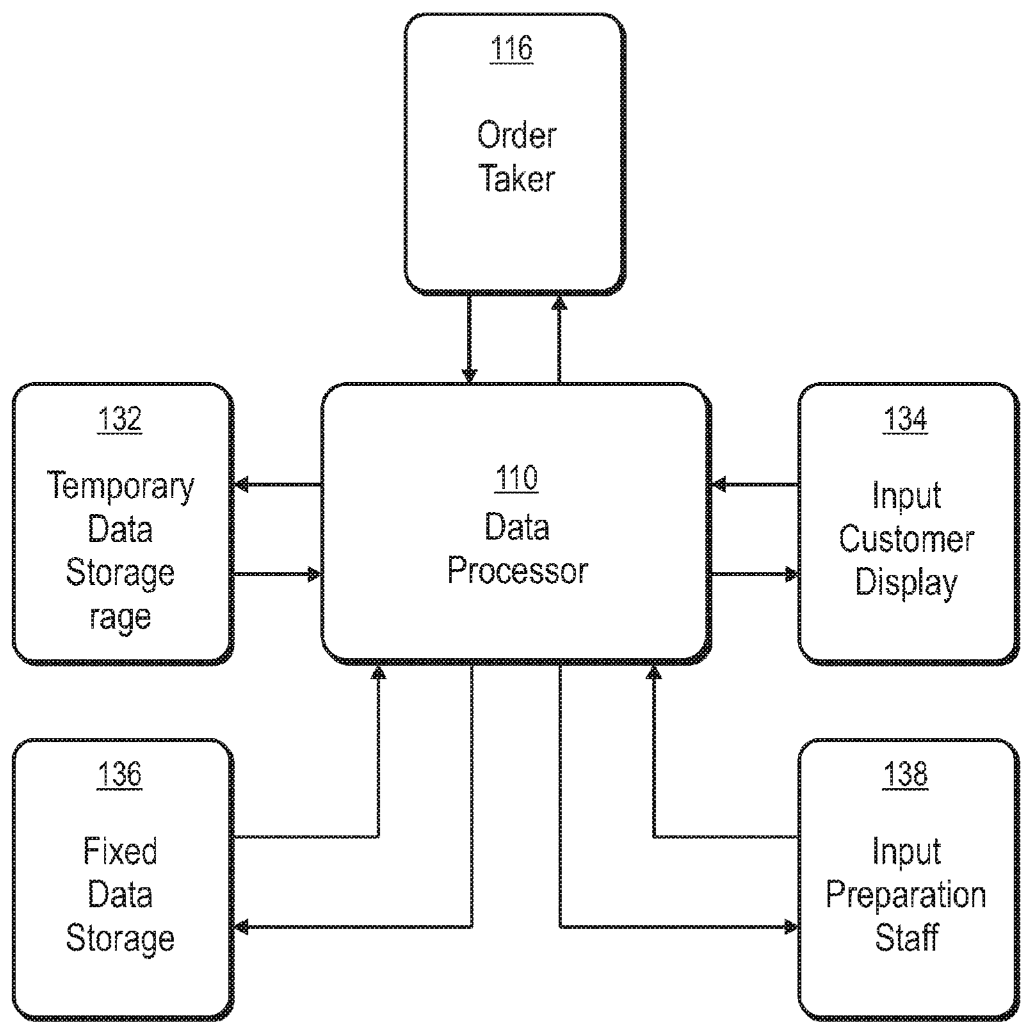
FIG. 3 is a flow diagram of the process of showing data flow in a data processing unit.

Referring to FIG. 3 there is a flow process diagram of functions of the data processing unit. FIG. 3, 110 is the computing data processing unit of the system. It will receive or access data from 136 fixed data storage and write to the data storage system. The data, such as menu items, prices, preparation time and the like, are "fixed" in the sense that they are not immediately variable. The system will have a mechanism allowing a manager to log in and mark any item such as "Sold Out" so that customers cannot continue ordering an item we no longer have in stock. The data may be updated as often as needed and there are means for updating the data. This management or administrative unit allows input, changes in data storage and for receiving data output (see FIG. 5). Temporary, calculated and intermediate calculation values are stored in data storage unit 132 and can be accessed and written to by the data processing unit, 110. For example, the preparation time is affected by staff levels and skill levels in the algorithm. Customer input is from 134 and includes ordered item, edits, delay or requested wait time and the like. Order taker(s) (116) provides input/output. These staff members may be located at a call center or in a restaurant and will take orders by phone from customers and enter into the system. They may be assigned to roam the parking lot of a restaurant location and take orders from customers in cars. Input from the preparation staff is shown as 138 and includes start time, order ready information and may include continuous update of order status. There is also provided means for the Preparation Staff and order administration/management to input data on orders that are being processed. These will include individual computer tablets or equivalent or larger display panels that will have data on customer ID, ordered item, requested delay time and calculated preparation order sequence. It may not be expedient for the preparation staff to use touch or keyboard inputs but foot operated input devices will be suitable. Voice control input to suitable receivers are preferable. There an abundance and variety of voice activated/control technology available and can easily be adapted for use in the system of the invention.

The data processor unit will calculate the needed information and send it to the appropriate location. In general, communication for the data processing unit to customer's display and preparation staff will be wireless. The data processing unit and data storage may be a dedicated system or operated by remote shared distributive computing ("the cloud"). A cloud system will generally be preferred.

The system may also interconnect more than one restaurant (store) unit into a combined system and connected to the data processing unit with a complete feedback loop to and from each restaurant to provide information of all orders to each location. This system is illustrated in the flow diagram of FIG. 5. This information is updated when every order in progress is noted as complete. This multi-location system allows management of order preparation to the most efficient location where possible. It is especially helpful for scheduling and preparing prescheduled and delivery orders. Each restaurant unit, 320, 322 and 324, will have its own server (data processor) that will be able to communicate with the central data processor 310. The order data starts off on the server (data processor) hosting the website and is then passed to the appropriate store server. One unique feature is that the system data processors are then passing data back and forth to the system website to update the "overall order queue" timing of current orders.

Each restaurant unit, 320, 322 and 324, has the ability to adjust certain timing variables based on current in-unit conditions to increase or decrease wait times displayed to guests currently ordering. The system will access in-unit schedules and staff positions and skill levels to determine team's productive capacity at any given time interval on any given day. The management display and input unit, 312 is connected to the data processing unit, 310, to allow administrative input and to be able to obtain real time and calculated information of the operations. Inputs include, pricing, staff level at each location, order status, particularly prescheduled and delivery orders, etc. The system also allows for delivery drivers, 314, to be re-routed from one store pickup location to another store pickup location by a central logistics control mechanism factoring in variables to shorten the overall wait time for customers, 334.

Figure 5:
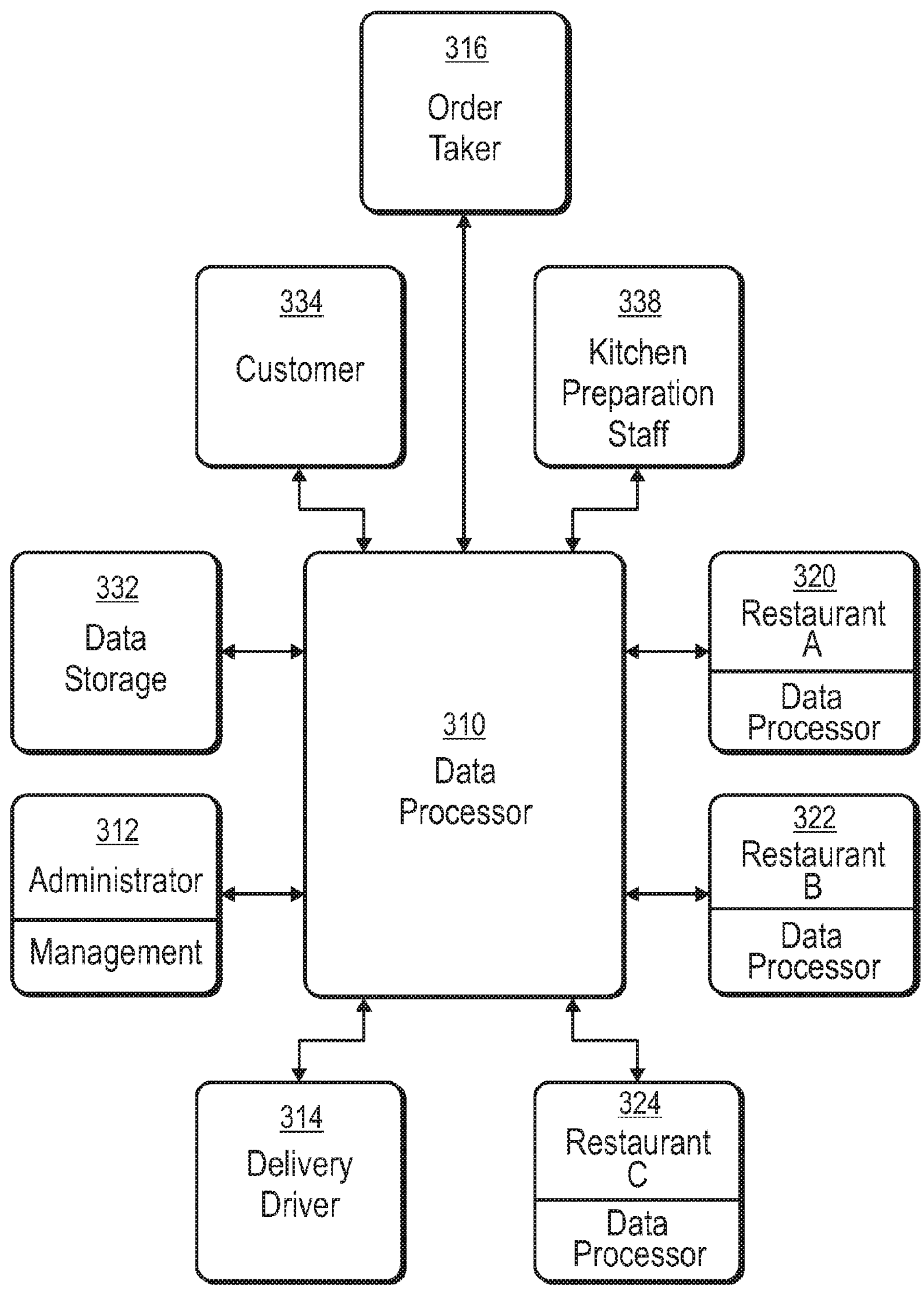
FIG. 5 is a flow diagram of the process of an embodiment of the invention.

Manager(s) can login and update the system to current staff levels and in store conditions so that adjustments to timing are made; for example, sick staff members, delivery driver in vehicle accident, etc. The system will also allow managers, 312, to manually increase or decrease wait timing to slow or speed up order inflow. The system will supply data from future guest orders (for tomorrow, two days out, etc.) to kitchen/bakery production software and vendor inventory ordering software to help better prepare product quantities for future work dates. FIG. 5 illustrates the system having multiple stores interconnected. The data processing unit 310 and data storage units are central (on-site or cloud). The data processing unit receives inputs and provides data and output to each of the interconnected restaurants A (320), B (322) and C (324). It can receive and provide data (directions etc.) to a delivery driver (or Drone) and provide order information to preparation Kitchen staff, 338, and to the Administration unit 312. Order taker(s) are also an optional input/output source, 316. These staff members may be located at a call center or in a restaurant and will take orders via phone from customers, 334, and enter into the system. They will also roam the parking lot and take orders from customers in cars. This will allow orders by those customers who do not wish to use their own mobile devices. It will also allow better customization of future orders, as the order takers will be able to gather and input to the system identification data such as the customer's name, phone number, credit card number, automobile license plate number and the like to make the ordering process more convenient for guests. For example, the customer's vehicle license plate number is saved to the guest's user profile so that staff members will know the guest's name, have stored payment information tied to the account, see the guest's favorites, past orders, etc. as they approach the guest's car. This should make the ordering experience more convenient for the guest. With payment types stored to the user profile, on return visits in the same car, guests will not need to physically provide their credit card.

The following are examples of the kind of calculations and configurable variables that will be handled by the data processing unit. The terms "Guest" and "Customer" are used interchangeably herein and have the same meaning.

Input Variables' Definition for Production Timing of Orders:

(M) Make time per item (varies depending on item and programmed within each item definition) on ticket (Defined in seconds.)
 For items like Boxed Lunches and Sandwich Trays, which have modifications that can be modified; the Make Time is a sum of the Make Times from the two levels:
 Box Lunch M=30
 Sandwich=120
 $C_T$=10 seconds per customization (see next definition below)
 Cookie M=60
 Chips M=60
 Total M therefore=270 seconds (assuming no modifications for the sandwich)

($C_T$) Customization time per item per customization (Varies depending on item and programmed within each item definition. Defined in seconds.)

($C_Q$) Quantity of customizations (Each default ingredient removed and each additional ingredient added counts as 1. $C_Q$ represents the total of all changes from the default recipe.)

(D) Duplicate item time reducer (Varies depending on item. This is programmed as a percentage equal to or less than 100% within each item definition. The default is 100% unless edited. This variable is not used for the first item of any type. It is only factored into the calculation for the $2_{nd}$, $3_{rd}$, $4_{th}$, etc. identical items.)

IF (N)=1, THEN (D)=1. IF (N)>1, THEN (D)=defined % for $N_2$, $N_2$, $N_3$, $N_{ETC}$ (N) Number of identical items ordered on current ticket (I) Individual Names marked on each item. This is defined across the entire site as a quantity of seconds. It must be editable by the admin user. Initially define as 10 seconds. IF a guest selects "Yes" to mark each item with someone's name, THEN (I)=defined time. IF a guest selects "No", THEN (I)=0.

($P_S$) Production seconds calculated for each item.

$P_{S1}=([M_1+(C_{T1}\times C_{Q1})]+I)+[(\{M_1+(C_{T1}\times C_{Q1})]\times D_1\times I)\times(N_{21}-1)\}$ ($P_{SALL}$) Production seconds sum for all items.

$P_{SALL}=P_{S1}+P_{S2}+P_{S3}+P_{SETC}$ ($S_{PQ}$) Staff production quantity at time of order (each catering production person staffed adds 1) Staffing levels are input on a weekly basis into a schedule screen by the Catering Manager.

($S_{PS}$) Staff production skill level at time of order (skill level selected from "Slow", "Average", "Fast") Skill levels are input on a weekly basis into a schedule screen by the Catering Manager. The default skill level is "Average." Skill levels are defined numerically by the admin user. "Average"=1; "Slow"=0.75; "Fast"=1.25 for the beginning.

($P_T$) Production total time.

$P_T=P_{SALL}/(S_{PQ}\times S_{PS})$ ($G_M$) Greatest make time of any individual item on the order. $PU_{CALC}$ cannot be less than the greatest make time (M) for any item on the order ticket. For example, if one pizza is ordered with M=480 seconds; and four staff members are working (then $S_P$=4); and (assuming no previous orders) $PU_{CALC}$ would equal 120 seconds. But, one pizza cannot be made in less than 480 seconds no matter how many staff members are working. Therefore, $PU_{CALC}$ would result in 480 seconds+the Buffer time ($B_P$) in this case.

$G_M$=MAXA ($M_1$, $M_2$, $M_3$)

($G_{M2nd}$) $2^{nd}$ Greatest make time of any individual item on the order. This is used in later logic.

($G_T$) Greater of ($P_T$) Production total time OR ($G_M$) Greatest make time of any individual item.

$G_T$=MAXA ($P_T$, $G_M$)

($B_P$) Buffer production time which equates to the minimum buffer time in seconds added to the production stage for every order. This allows a factor for the time it takes the production staff to review each order, package it, etc. This is defined across the entire site as a quantity of seconds. Initially define as 60 seconds. It must be editable by admin user.

($T_C$) Time to complete order.

($O_E$) Order Entry time.

($O_{TDESIRED}$) ASAP or Future (a specific desired scheduled time in the future).

($O_F$) Order Fire time. The time the order is fired into production. This needs to be passed to the interface so that it can be inserted with each order into Micros.

The system defines the ($O_F$) Order Fire time as EITHER:

For an "ASAP" as the current time now OR

For a scheduled time as ($O_{TDESIRED}-T_C$) for order "X".

($O_P$) Order Position. The current production position for each order. This defines which order is to be produced $1^{st}$, $2^{nd}$, $3^{rd}$, etc. This is dynamic. As orders' statuses are changed, the positions are updated for every other order. As new orders are inserted into the position lineup, the order position changes for each existing order.

($O_S$) Order Status.

Received=Order received from website and into Micros

Ready=Production is finished and order is marked in store location as "Ready" for pickup or delivery.

Out for Delivery=Only applies to Delivery orders

Completed=Tendered in store location which passes message to website.

If the order status is "Received", then the order's $G_T$ is factored into Q below. If the order status is "Ready", "Out for Delivery" or "Completed"; then the order's $G_T$ is NOT factored into Q below.

($O_T$) Order Type. Either "Pickup" or "Delivery".

($O_\$$) Order $ amount.

($T_E$) Time Elapsed. The time that has passed since each prior order was submitted. If the order is no longer "Received", then the clock is zeroed out and disregarded.

(Q) Queue of seconds required for each previous ticket already ordered and awaiting production. If the order status is no longer "Received", then the clock is zeroed out and disregarded. If the time the order's production is scheduled to start ($T_S$) is greater than the order fire time of the current order ($O_F$), then Q equals ($T_C$) the time to complete order. If the time the order's production is scheduled to start ($T_S$) is NOT greater than the order fire time of the current order ($O_F$), then Q equals ($T_C$) the time to complete order minus the difference between the order fire time of the current order ($O_F$) and the time the order's production is scheduled to start ($T_S$).

$Q_1$=IF($O_{S1}$="Received", (IF($T_{S1}>O_2$, $T_{C1}$, (MAX(($T_{C1}-(O_{F2}-T_{S1})$), 0)))), 0)

($Q_{TOTAL}$) This equates to the total production seconds of ALL pickup AND delivery orders minus the time elapsed since the orders were placed.

$Q_{TOTAL}=Q_1+Q_2+Q_3+Q_{1ETC}$ ($T_S$) Time production of order is scheduled to start.

($PU_{CALC}$) Precise time calculated for production of order to be finished and order to be picked up by guest or a delivery driver. This time is constantly recalculated as other orders' statuses change and as new orders arrive.

($PU_R$) $PU_R$ is equal to $PU_{CALC}$ rounded up to the nearest X minute interval. This interval should initially be 5 minutes and needs to be configurable in the admin section of the website.

($PU_{CONFIRM}$) This time initially equals $PU_R$ and "Locks" once an order is submitted. It does NOT change as other orders change. This needs to have a count-down timer to force the guest to "Submit" the order within "X" seconds in order to insure that confirmation time.

($T_{BT}$) Time between the current positioned order's scheduled start time and the next higher positioned order's calculated finish time.

$T_{BT12}=T_{S2}-PU_{CALC1}$ ($R_T$) Rounding time. This calculation differs for Pickups and Deliveries For Pickups, the difference between the $PU_{CALC}$ time and the $PU_{CONFIRM}$ time.

$R_T=PU_{CONFIRM}-PU_{CALC}$

For Deliveries, the difference between the $PU_{CALC}$ time and the $PU_{CONFIRM}$ time.

$R_T=D_{CONFIRM}-D_{CALC}$ ($S_T$) Slip Time. The sum of $T_{BT}$ and $R_T$.

$S_T=R_T+T_{BT}$ ($R_{TNEXT}$) Minimum rounding time of the current positioned order and the next position, next 2 positions, next 3 positions, etc.

$R_{TNEXT}$=IF($Q_{TOTAL}$>0,MIN($RT_{T1}$:$R_{ETC}$),FALSE)

($S_{TMAX}$) Maximum Slip Time. This calculates the maximum amount of time of an order that can be slipped in front of the current positioned order. This is the lesser amount of time calculated by $S_T$ or any $R_{TNEXT}$.

$S_{TMAX}$=MIN($S_T$: $R_{TNEXTETC}$)

581 Database Lookup for Order Preference/Order Slipping:

Order Preference/Slip Logic.

In the initial time selection window on the website, the user selects between "Today" and "Future date" and then selects a time. Only when the user selects "Today" will they then see "ASAP" as the first time option. If the user selects "Future date", they will NOT see "ASAP" as a time option. The guest will then select either "ASAP" or a defined time later today or on a future date. These later scheduled times will be treated the same by the order timing logic. Only "ASAP" orders will behave differently.

If an order "X" is defined as an "ASAP" ($O_{TDESIRED}$), then the system will search in the database starting with order position #1 and proceeding through each subsequent, order comparing the ($T_C$) time to complete order "X" with the ($S_{TMAX}$) maximum slip time calculated for order position #1.

If the ($T_C$) of order "X" is less than the ($S_{TMAX}$) of order position #1; then order "X" will be inserted into the database in front of order position #1 and become order position #1. (The order that was originally defined as order position #1 will become order position #2, etc). Order position #1 should always be the "Received" order with the closest $PU_{CALC}$ time to the current time.

If the ($T_C$) of order "X" is greater than or equal to the ($S_{TMAX}$) of order position #1; then the system will move to comparing order "X" to order position #2. If the ($T_C$) of order "X" is less than the ($S_{TMAX}$) of order position #2; then order "X" will be inserted into the database in front of order position #2 and become order position #2. (The order that was originally defined as order position #1 will remain as order position #1. The order that was originally defined as order position #2 will become order position #3, etc).

If the ($T_C$) of order "X" is greater than or equal to the ($S_{TMAX}$) of order position #1 AND #2; then the system will move to comparing order "X" to order position #3, etc. until a position is found for order "X".

The system defines the ($O_F$) Order Fire time as EITHER:

For an "ASAP" as the current time now OR

For a scheduled time as ($O_{TDESIRED}-T_C$) for order "X".

The system also fixes the $PU_{CONFIRM}$ time for order "X" at this point.

If an order "X" specifies a desired scheduled time ($O_{TDESIRED}$=some fixed time), then the system will search in the database starting with the order position having a $PU_{CONFIRM}$ time equal to or after the desired scheduled time for order "X".

If no order exists, order "X" will be inserted as the last order position at the desired scheduled time.

If an order exists with a $PU_{CONFIRM}$ time=order "X's" desired scheduled time ($O_{TDESIRED}$) then the system will check if the ($T_C$) of order "X" is less than the ($S_{TMAX}$) of the positioned order.

If so, then order "X" will be inserted into the database in front of the positioned order at order "X's" desired scheduled time ($O_{TDESIRED}$).

If NOT, then the system will move to comparing order "X" to the next positioned order.

If an order exists with a $PU_{CONFIRM}$ time after order "X's" desired scheduled time ($O_{TDESIRED}$), then the system will check if the ($T_C$) of order "X" is less than the ($S_{TMAX}$) of the positioned order.

If so, then order "X" will be inserted into the database in front of the positioned order at order "X's" desired scheduled time ($O_{TDESIRED}$).

If NOT, then the system will move to comparing order "X" to the next positioned order.

The system defines the ($O_F$) Order Fire time as EITHER the current time now OR as $O_{TDESIRED}-T_C$ for order "X". The system also fixes the $PU_{CONFIRM}$ time for order "X" at this point.

Input Variables for Delivery Timing of Order:

($PU_{CONFIRM}$) Time derived from formula above.

($A_{APT}$) Apt/Suite/Floor Buffer allows additional time to be configured for delivery addresses in which the guest inserts data into the "Apt/Suite/Floor" field on the Delivery Address Information page. Because delivering to a multi-story office building or apartment complex requires substantially more time than a standard residence, this will allow us to adjust the time allowed for these types of delivery addresses. The time added is configured across the entire site and initially set to 10 minutes.

($B_D$) Buffer delivery time which equates to the minimum buffer time in seconds added to every delivery. (This allows a factor for time it takes the driver to check each order, stow each order, park their car, etc; regardless of distance traveled.) This is configurable across the entire site and is setup as a two column lookup chart in \$250 increments. The order's dollar amount ($O_S$) is rounded up to the neat increment of \$250 and then referenced to determine the number of minutes to add to each order based on a configurable chart.

$$= \text{IF}\ (O_T = \text{"Delivery"}, ((\mathit{VLOOKUP}(\text{CEILING}(O_\$, 250), \mathit{ReferenceChart})) + (\text{IF}(A_{APT} = \text{"Yes"}, 10{:}00{:}00, 0))), \text{"}\mathit{Pickup}\text{"})$$

($L_D$) Length of time required to drive from store location to the delivery address. Ideally this is determined based on average drive time from the store location to the delivery address.

($F_T$) Full Trip time to deliver to address and return to store location $(F_T)=(B_D)+[2*(L_D)]$ (W) Wait time queue required for each previous delivery ticket already ordered and awaiting delivery. If the order status is no longer "Received", then the clock is zeroed out and disregarded. If the order is not a "Delivery" then the clock is zero and disregarded. If the order's Delivery Departure Time ($D_D$) is NOT greater than the current order's ($PU_{CONFIRM}$) time, then W equals ($F_T$) the Full Trip time of the previous order minus the difference between the $PU_{CONFIRM}$ time of the current order and the Delivery Departure Time ($D_D$).

$Q_1$=IF($O_{S1}$="Received", (IF($D_{D1}$>$PU_{CONFIRM2}$, $F_{T1}$, (MAX(($F_{T1}$−($PU_{CONFIRM2}$−$D_{D1}$)),0)))),0)

($WS_{DQ=1}$), ($WS_{DQ=2}$), ($WS_{DQ=3}$), ($WS_{DQ=4}$), ($WS_{DQ=5}$), and ($WS_{DQ=ETC}$) Each of these equates to the total wait queue for the next order under various driver quantity scenarios.

($WS_{DQ=1}$) sums W for all prior Received Delivery orders ($WS_{DQ=2}$) sums every other prior Received Delivery order, and skips the immediate prior order ($WS_{DQ=3}$) sums every third prior Received Delivery order, and skips the immediate two prior orders ($WS_{DQ=4}$) sums every fourth prior Received Delivery order and skips the immediate three prior orders ($S_{DQ}$) Driver staff quantity at time of order (each driver staffed adds 1)

($WS_{DQ}$) Determines which ($WS_{DQ=x}$) column to use based on the value of ($S_{DQ}$)

If $S_{DQ}$=0; then no delivery is possible (because no drivers are scheduled at this time at this location). The website system must next:

Check for other less proximate locations that offer delivery to the guest location. And then apply the same logic.

If no alternative delivery location exists, then inform the guest: "Sorry, at the selected time no store is offering delivery service. You may continue your order as a pickup and choose a different time."

If ($S_{DQ}$)=1 use value in column ($WS_{DQ=1}$)

If ($S_{DQ}$)=2 use value in column ($WS_{DQ=2}$)

If ($S_{DQ}$)=3 use value in column ($WS_{DQ=3}$)

($D_D$) Delivery Departure Time $D_D$=$S_{DQ}T_Q$+$PU_{CONFIRM}$ ($D_{CALC}$) Delivery Calculated arrival time at guest address ($D_R$) Delivery Rounded time. This interval should initially be 15 minutes and needs to be configurable in the admin section of the website.

($D_{CONFIRM}$) Delivery Confirmed time. This time "Locks" once an order is submitted. It does NOT change as other orders change. This is the time returned to the guest on the "Verify & Submit Order" checkout page. This needs to have a count-down timer to force the guest to "Submit" the order within "X" seconds in order to insure that confirmation time.

($D_{COMPLETE}$) Delivery Return time to store location $D_{COMPLETE}$=$D_D$+$F_T$ System Requirements:

1. Order Status Changes:
   a. Feedback loop that allows Order Status changes from in store tool. A method by which completed orders can be "bumped" at the store level to mark the status ($O_S$) as "Ready", "Out for Delivery", or "Completed" and then transmitting that information back to the calculator tracking the ($Q_{TOTAL}$) for each store is necessary to keep ($Q_{TOTAL}$) constantly updated. This same system will send a text or email to the guest letting them know their order is complete and ready for pickup. We will also use this to populate the same information to a visual screen outside the pickup order window. The website needs to receive the change in Order Status.
   b. This is an easy method for staff to reduce the accumulated queued production and delivery waiting minutes (in situations in which the store is working ahead of the system's expectations).
2. Emergency Button:
   a. There is an easy method for coordinators to increase the total queued production ($Q_{TOTAL}$) and delivery waiting ($WS_{DQ}$) minutes (in situations in which the store is working behind expectations). An in store visual tool is ideal. Two clocks with increase arrows—one for each count-down clock. "All orders expected Ready in __________ minutes." And "All deliveries expected Completed in __________ minutes."
   b. If the Emergency Button is used to increase either clock, the increased amount resets to zero at both 11:00 pm and 3:00 pm.
   c. If the Emergency Button is used to increase either clock, an alert email is sent to pre-determined manager email accounts.
   d. If the Emergency Button is used to increase either clock, the date, time and amount of minutes increased is logged by the system. Reference these logs to better tune the system over time.
3. Item level configurations:
   a. At the admin level, there is a method to input configurable parameters: M, $C_T$, D for every item. These are required fields for every item.
4. Site level configurations:
   a. At the admin level, there is a method to input the following configurable parameters:
      i. (I) Individual Names marked
      ii. ($B_P$) Buffer Production
      iii. ($PU_R$) Pickup Rounded time
      iv. ($A_{APT}$) Apt/Suite/Floor Buffer across the entire site.
      v. ($D_R$) Delivery Rounded time
   b. At the admin level, there is a method to input and edit the following reference configurable parameters:
      i. ($S_{PS}$) Staff production skill level
      ii. ($O_\$$):($B_D$) Order $ Amount:Buffer delivery time lookup chart
5. Schedule Chart:
   a. Base Schedule: At the manager user level, there is a method for inputting the number of production staff and driver staff scheduled ($S_{PQ}$) and ($S_{DQ}$) for each hour of the day and the group's skill levels ($S_{PS}$). There is a "base" schedule that repeats to all future weeks not yet edited for a specific week/day. Having a base schedule defined will let a guest get a fairly accurate order response many weeks into the future even though the manager has not yet input a schedule. Also, it will save time when creating the specific weekly schedules as the base schedule can be copied and edited.
   b. Edited Schedule: At the manager user level, weekly the manager has a method to use the base schedule as a starting template for any week's specific schedule and saving the edits made to it. Once a base schedule has been copied, edited and saved, the system should reference that specific schedule rather than the base schedule for the week in question.
   c. Daily edits: At the coordinator user level and higher, the specific schedule for today and tomorrow can be edited to increase or decrease staff levels. This user can see and adjust ($P_{PQ}$) and ($S_{DQ}$). This user cannot see skill levels ($S_{PS}$).

6. How to get it Faster?
  a. $PU_{vs}D$: There is the ability to show the time added for delivery to every delivery order: "Delivery adds 45 minutes to your order time. Switch to Pick Up?" This appears on the "verify and submit" page and allows an easy switch to "Pickup" without having to progress through every checkout page again. The system suggests the closest location for pickup and confirm that selection.
    i. $=(D_{CONFIRM})-((TIME(HOUR(PU_{CALC}), CEILING(MINUTE(PU_{CALC}), PU_R),0)))$
  b. $G_{MFASTER}$: Critical Long Lead Time Item—This time hurdle is configurable across the entire site and is initially set at 5 minutes. The calculation subtracts ($G_{M2nd}$) from ($G_M$) to find the time difference between the longest lead make time and the 2nd longest lead make time. This provides the guest information of their order's longest wait item and suggests how much time can be shaved off of the order by eliminating the one longest lead item. If the difference is greater than the configured 5 minutes, the system will display "Item X" adds 6 minutes to this order's wait time. For example, a pizza takes about 8 minutes to prepare. Soup takes about 1 minute to prepare. If a guest orders only those two items, the system will display "Pepperoni Pizza adds 7 minutes to your order's wait time." This message resides on the "Verify and Submit" page of the guest's device or can show up on the cart "Add Items" screen. If the subtraction results in a number less than 5 minutes, then No Display will result.
    i. $=IF(((G_M-G_{M2nd})>G_{MFASTER}\ \$4), (G_M-G_{M2nd})$, "No Display")
7. Reporting: Desired/Pickup Delivery Time vs Confirmed time. The system measures the guest's desired delivery (and/or pickup) time versus what the system allowed. in the system has unique waiting time logic to determine when the system can promise each order. Management will want to know, however, whether or not that timing met the guest's expectation for timing. There are four different reported times that can be viewed as one or studied independently:
  a. IF Pickup AND, IF ($O_{TDESIRED}$)=ASAP, THEN $PU_{CONFIRM})-(O_E)$=Reported Differential
  b. IF Pickup AND, ($O_{TDESIRED}$)=schedule time "x:xx", THEN $P_{CONFIRM})$-(x:xx)=Reported Differential
  c. IF Delivery AND, ($O_{TDESIRED}$)=ASAP, THEN $D_{CONFIRM})-(O_E)$=Reported Differential
    i. IF Delivery AND ($O_{TDESIRED}$)=schedule time "x:xx", THEN $D_{CONFIRM})$-(x:xx)=Reported Differential Example Order WEB ID #1001:

2 identical cups of coffee (no customization), 2 identical Sandwiches (no customization), and 2 identical Cookies (no customization). Guest selects "No" to mark each item with someone's name. Guest submits order at 11:00:00 AM as a Pickup and selects "ASAP" as the time. Four staff members working in catering at time of order. Staff skill level is average.

No previous orders. As a result the ($O_P$) is 1.

(M) Make time per item (varies depending on item type) on ticket (seconds)
  Assume 60 seconds per coffee, 120 seconds per sandwich, 60 seconds per cookie ($C_T$) Customization time per item per customization
  Assume 15 seconds per customization per coffee, 10 seconds per customization per sandwich, 0 seconds per customization per cookie (cookies are not customizable).

($C_Q$) Quantity of customizations
  0, 0, 0

(D) Duplicate item time reducer
  100% for coffee, 75% for sandwiches, 25% for cookies (N) Number of identical items ordered on current ticket
  2, 2, and 2

(I) Individual Names marked on each item.
  "No"=0 seconds ($P_{SALL}$)=6 Minutes 45 Seconds (This assumes one person is making the entire order.)

($S_{PQ}$) Staff production quantity at time of order (each catering production person staffed adds 1)
  Four staff members equates to 4

($S_{PS}$) Staff production skill level
  "Average"=1

($P_T$)=1 Minute 41 Seconds Estimated for Pick Up Order WEB ID #1001

($G_M$)=2 Minutes (2 minutes for a Sandwich); therefore the $G_T$ equals 2 minutes.

($B_P$) Buffer time which equates to the minimum buffer time in seconds added to every pickup.
  Assume 60 seconds per order.

($T_C$)=3 minutes ($O_E$)=11:00:00 AM ($O_{TDESIRED}$)="ASAP" This is what the guest selects as the desired time on the "Order Date & Time" Screen.

($O_F$)=11:00:00 AM ($O_P$)=1

($O_S$)=Received ($O_T$)=Pickup ($O_\$$) Order \$ amount=19.00

($Q_{TOTAL}$) clock is zero
  No previous orders equates to 0 for ($Q_{TOTAL}$)

($T_S$)=11:00:00 AM (instantaneous because no prior orders exist)

($PU_{CALC}$)=11:03:00 AM ($PU_R$)=11:05:00 AM (Rounding set to 5 minute intervals in system)

($PU_{CONFIRM}$)=11:05:00 AM This is the time returned to the guest on the "Verify & Submit Order" checkout page. This has a count-down timer to force the guest to "Submit" the order within "X" seconds in order to insure that confirmation time.

($T_{BT}$)=empty because there is no previous Received order ($R_T$)=2 minutes ($S_T$)=2 minutes ($R_{TNEXT}$)=dependent on the next order(s) and the time(s) at which they are submitted ($S_{TMAX}$)=2 minutes (if this is the only order). This is also dependent on the next order(s).

Example Order WEB ID #1002:

20 identical Sandwiches (no customizations). Guest selects "No" to mark each item with someone's name. Guest submits order at 11:01:00 AM as a Pickup and selects "ASAP" as the time.

Four staff members working in catering at time of order. Staff skill level is average.

1 previous order. Slip logic is utilized to determine order position.

(M) Make time per item (varies depending on item type) on ticket (minutes)
  Assume 120 seconds per sandwich ($C_T$) Customization time per item per customization
Assume 10 seconds per customization per sandwich
($C_Q$) Quantity of customizations
0
(D) Duplicate item time reducer
75% for sandwiches
(N) Number of identical items ordered on current ticket
20
(I) Individual Names marked on each item.
"No"=0 seconds
($P_{SALL}$)=30 Minutes 30 Seconds (This assumes one person is making the entire order.)
($S_{PQ}$) Crew production quantity at time of order (each catering production person staffed adds 1)
Four staff members equates to 4
($S_{PS}$) Staff production skill level
"Average"=1
($P_T$)=7 Minutes 37 Seconds Estimated for Pick Up Order WEB ID #1002
($G_M$)=2 Minutes (2 minutes for a Sandwich); therefore the GT equals 7 minutes 37 seconds.
($B_P$) Buffer time which equates to the minimum buffer time in seconds added to every pickup.
Assume 60 seconds per order.
($T_C$)=8 minutes 37 seconds
($O_E$)=11:01:00 AM
($O_{TDESIRED}$)="ASAP" This is what the guest selects as the desired time on the "Order Date & Time" Screen.
($O_P$)=2 The system needs to do a database search as described in the section "Database Lookup Logic for Production Timing of every Order:" (Basically, because this order will take 8 minutes 37 seconds to complete and the maximum slip time for order position 1 is only 2 minutes, this order cannot be inserted in front of order position #1.) After performing this logic and search, the system inserts this order into position "2".
($O_F$)=11:01:00 AM
($O_S$)=Received
($O_T$)=Pickup
($O_\$$) Order $ amount=110.00
($T_{E1}$)=1 minute passed since the order in position #1 was placed.
($Q_{TOTAL}$)=2 minutes (remaining production time for order position #1 to be completed)
($T_S$)=11:03:00 AM (This order's production will not begin until the prior orders are completed.)
($PU_{CALC}$)=11:11:37 AM
($PU_R$)=11:15:00 AM (Rounding set to 5 minute intervals in system)
($PU_{CONFIRM}$)=11:15:00 AM This is the time returned to the guest on the "Verify & Submit Order" checkout page. This has a count-down timer to force the guest to "Submit" the order within "X" seconds in order to insure that confirmation time.
($T_{BT}$)=0
($R_T$)=3 minutes 23 seconds
($S_T$)=3 minutes 23 seconds
($R_{TNEXT}$)=3 minutes 23 seconds, (but dependent on the next order(s) and the time(s) at which they are submitted.)
($S_{TMAX}$)=3 minutes 23 seconds, (but dependent on the next order(s) and the time(s) at which they are submitted.)

Example Order WEB ID #1003:

2 identical cups of coffee (no customization), 2 identical Sandwiches (no customization), and 2 identical Cookies (no customization). Guest selects "No" to mark each item with someone's name.

Guest submits order at 11:02:00 AM as a Pickup and selects "ASAP" as the time.

Four staff members working in catering at time of order. Staff skill level is average.

2 previous orders. Slip logic is utilized to determine order position.

Delivery Buffer time of 10 minutes.
1 Delivery Driver.
15 minute length of time to driver to guest location.
($PU_{CONFIRM}$) Pick Up Time derived from production logic
$PU_{CONFIRM}$=11:20:00 AM
($O_\$$) Order $ amount=21.00
($A_{APT}$)=No
($B_D$) Delivery Buffer Time Lookup finds
10 minutes
(L) Length of time required to drive from store to location
15 minutes
($F_T$) Full Trip time=40 minutes
($S_{DQ}$) Driver staff quantity at time of order (each driver staffed adds 1)
1
($W_1+W_2$) Wait time from previous delivery tickets already ordered, but not yet delivered (total minutes)
0
($WS_{DQ}$)=0
($D_D$) Delivery Departure Time=11:14:37 AM
($D_{CALC}$) Delivery Calculated arrival time at guest address=11:39:37 AM
($D_R$) Delivery Rounded time=11:45 AM
($D_{CONFIRM}$) Delivery Confirmed time=11:45 AM
$D_{COMPLETE}$) Delivery Return time to store location=11:54:37 AM Example Order #4: (Arrives 1 Second after Order #3)

20 identical Sandwiches (no customizations). Guest selects "No" to mark each item with someone's name.

Four staff members working in catering at time of order. Staff skill level is average.

1 previous order.
Pickup Buffer time of 60 seconds.
Delivery Buffer time of 10 minutes.
1 Delivery Driver.
20 minute length of time to driver to guest location.

(W) wait time from previous delivery orders does exist and needs to be calculated.

($P_T$) Pick Up Time derived from formula above
13 minutes and 59 seconds
($O_\$$) Order $ amount=112.00
($A_{APT}$)=Yes
($B_D$) Delivery Buffer Time Lookup finds
10 minutes for Apt=Yes and 10 minutes for the order dollar size=20 minutes total for $B_D$
($B_D$) Delivery Buffer Time
10 minutes
(L) Length of time required to drive from store to location
20 minutes
($F_T$) Full Trip time=60 minutes
($S_{DQ}$) Driver staff quantity at time of order (each driver staffed adds 1)
1
($W_1+W_2+W_3$) Wait time from previous delivery tickets already ordered, but not yet delivered (total minutes)
31 minutes and 23 seconds remains for $W_3$ ($WS_{DQ}$)=31 minutes and 23 seconds ($D_D$) Delivery Departure Time=11:54:37 AM ($D_{CALC}$) Delivery Calculated arrival time at guest address=12:34:37 AM ($D_R$) Delivery Rounded time=12:45 AM ($D_{CONFIRM}$) Delivery Confirmed time=12:45 AM ($D_{COMPLETE}$) Delivery Return time to store location=12:54:38 PM FIG. 3 illustrates the configuration and data flow in the data processing unit 110. In addition to the functions detailed above the data processing unit and associated data storage there is optionally and preferably an Accounting module (124 in FIG. 1). The Accounting module, 124, is also a data processing system with data storage and computational components.

Inputs from the Data Processing Unit 110 will include order details, customer identification, payments and payment information, preparation time, order wait time and the like.

The Accounting unit allows inventories to be updated, supply orders calculated and made, as well as calculating and providing financial information for accounting records that may be automated. Moreover, order details can be matched with customer identification and payments details so that the order can be matched with customer information. This will allow, inter alia, special offers to be made to specific customers groups and the like. Order data will be inserted into $3^{rd}$ party point of sales (POS) system at each restaurant location via an interface.

In some embodiments the invention is a system and process for managing and scheduling an order is a restaurant with both pick-up business and delivery business. Scheduling take-out orders and delivery orders in the same preparation location (kitchen) is made more efficient while reducing wait time on pickup orders. This management process works basically the same as for pick-up orders except that driver pick-up, driver time availability, and various orders' delivery locations proximity to each other will be taken into account in the data process unit to determine the scheduling of preparation and calculating delivery time. This allows proximate orders to be clustered with one driver to speed up overall times. Driver location and arrival time will be displayed on the delivery customer's computer or device in the same manner as for pick-up customers.

Figure 4:
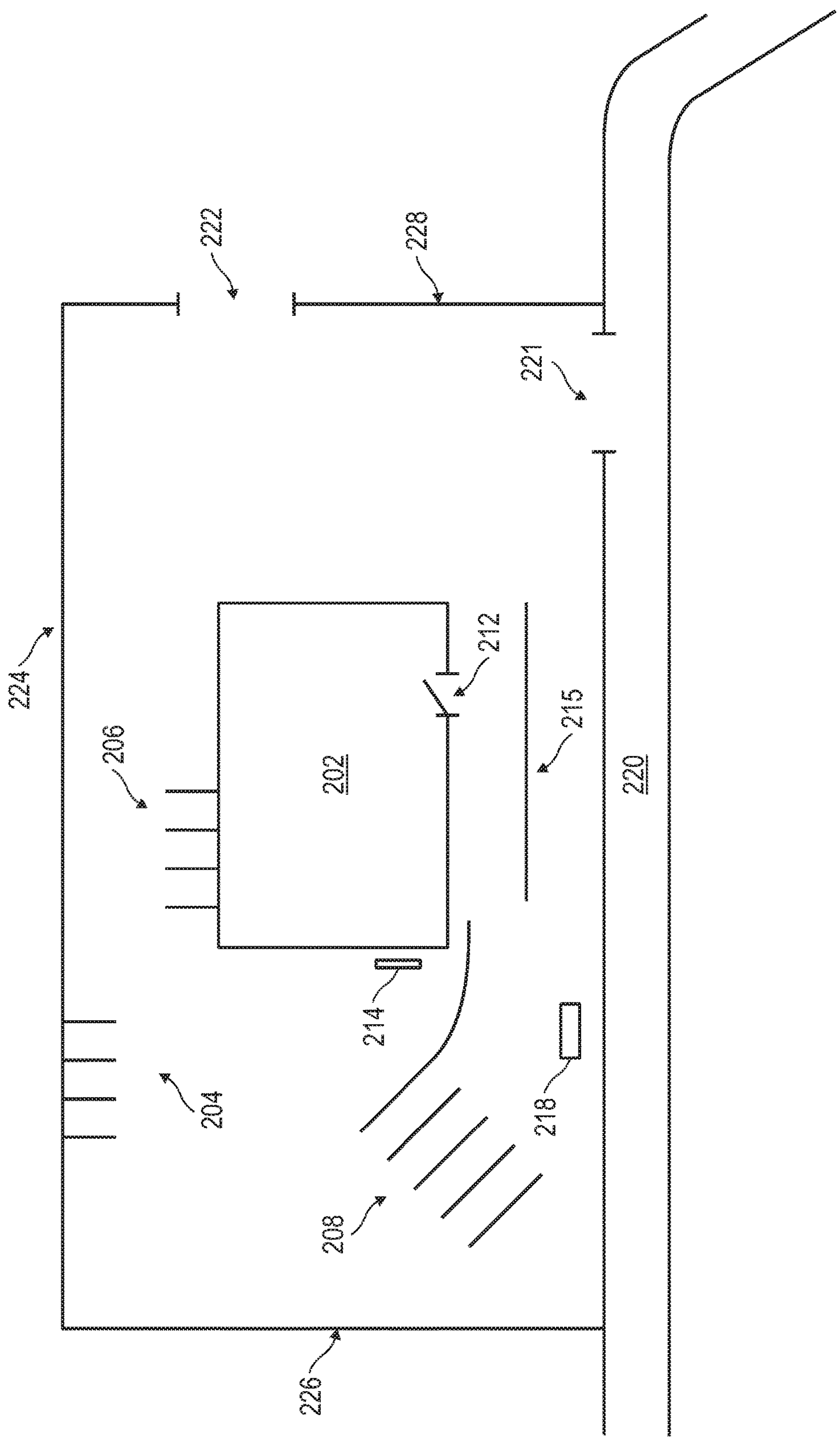
FIG. 4 is a schematic representation of a restaurant building and parking layout for an embodiment of the invention.

Referring to FIG. 4, which is an illustrative restaurant/lot arrangement of an embodiment of the invention, 202 is a restaurant building, 212 is an order pick-up window, 204 and 206 are customary parking spaces and 208 is a plurality of non-sequence parallel single vehicle parking spaces for cars placing orders and awaiting order ready notification. An access road 220 with lot entrances 221 and 222. The side by side non-sequential single vehicle parking spaces with access to a drive through lane leading to the pick-up window, allows customers to: a) not feel rushed when placing an order because no car is behind their vehicle waiting to order; b) proceed to the pick-up window immediately when their order is indicated as ready without the potential wait that can be caused in a traditional drive-through by other customer's queued vehicles in front of them awaiting their orders' production and completion. This can greatly reduce waiting time and improve the ordering experience. Having payment prior to pick-up also reduces wait time and makes the entire process more efficient. Items 224, 226 and 228 are lot perimeters. Item 214 is an optional outside display panel for displaying customers order ready information. Item 218 is an optional payment kiosk.

Customer (guests) may enter the lot and park in the customary parking spaces or the non-sequence single vehicle slanted spaces as they desire. Menus are displayed on customer's mobile devices or computers through the internet or other suitable distributive computing system and orders are made and processed when customers are at any location. Orders can be entered even before the guest enters the parking lot, scheduled for times in the future, etc. For customers wanting immediate as soon as possible service they will generally be located in the parking lot or headed towards the restaurant lot. The most expedient location will be the slanted non-sequence single vehicle spaces 208. For a customer without the ability to pay by mobile device they may drive by the optional kiosk 218 and pay with cash or credit card, or alternatively by an optional attendant that roams the parking lot to take orders and payment. There will be no provision for payment at the order pick-up window.

The system is also capable, in some embodiment, in acquiring the location of a customer by connection to a global positioning system (GPS) system in the customer's mobile device or computer. GPS coordinates of the ordering customer is read from their mobile device and sent to the data processing unit (system) to aid in calculating travel time to better estimate a "future" pickup time. This is especially helpful for a restaurant along a highway. Potential customers can search down their travel route for a suitable restaurant, order using their mobile device and have the system tell them how much time is required to reach the destination pick-up location. Operation of a similar GPS system for ordering is disclosed in US published application U.S. 2006/0293971, the relevant disclosures of which are incorporated herein by reference. U.S. Pat. No. 8,059,029 discloses a GPS tracking system with helpful information on the way and means to set up an appropriate GPS ordering system. The relevant disclosure of U.S. Pat. No. 8,059,029 are incorporated herein by reference.

In another embodiment the same GPS tracking is used to enable drone delivery or any other delivery method to static locations or moving vehicles while in transit. For the example above, the customer may wish to order, but not stop; preferring to have a drone meet the moving vehicle with the food order.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A process for reception, production, and non-sequential pickup of orders in a drive-in restaurant with a pick-up window comprising:

a) providing interactive menu and ordering information to a customer;

b) receiving provisional input from the customer comprising: (i) menu selections and (ii) desired order pickup time, and providing the provisional input to at least one data processing unit;

c) obtaining a set of production timing and slip logic (PTSL) rules for generating a dynamic position in a queue as a function of PTSL inputs comprising: (i) current order details, (ii) a current order queue, and (iii) configurable variables comprising: staff production quantity, staff production skill level, make time per menu item, and duplicate item time reducer(s);

d) applying the PTSL rules to calculate a provisional order pickup time, where step c) input (i) (current order details, of the PTSL inputs) comprises at least some of the provisional input from the customer;

e) providing feedback to the customer, the feedback comprising the provisional order pickup time;

f) dynamically repeating at least some of steps a)-e) as necessary as the customer updates the provisional input;

g) accepting non-provisional input of the customer as an order and accepting customer's electronic payment information and authorization to bill a customer's account;

h) applying the PTSL rules to: (1) generate an order fire time and (2) assign the order a dynamic position, as in step (c), in a production queue, where current order details comprise at least some details of the order accepted from the customer in step g);

i) generating a promised order pickup time from values comprising: (i) the dynamic position of the order in the production queue and (ii) the order fire time;

j) providing the promised order pickup time to the customer;

k) updating the dynamic position in the production queue, if necessary, when at least one event from a list of events occurs, while preserving the promised order pickup time, by applying at least a subset of the PTSL rules as in step h)(2), as necessary, the list of events comprising: update of production status of an order in the production queue, and insertion of a new order into the production queue;

l) providing selected information regarding the order to production staff, via at least one display device, according to the dynamic position of the order in the production queue; and m) transmitting to the customer information that the order is ready.

2. The process of claim 1 wherein additional input to the data processing unit by production staff is made by voice command to at least one receiver connected to the data processing unit and in turn connected to a mobile device or computer of the customer.

3. The process of claim 1 wherein the means to allow customers to proceed in the parking lot to an order pick-up window comprises a plurality of single vehicle parking spaces with access to a driving lane that abuts the pick-up window.

4. The process of claim 1 wherein PTSL inputs further comprise delay of order production by production staff, management staff, or both, and wherein staff, during order production, update at least some configurable variables which are used as PTSL inputs, which affect PTSL inputs, or both.

5. The process of claim 4 wherein at least some of the at least some configurable variables are inputted by voice commands.

6. The process of claim 1 also comprising means for input and retrieval of customer information and recognition of customers to the data processing unit.

7. The process of claim 1 also comprising an accounting module in the data processing unit to generate and provide accounting information based on the processing of customer orders.

8. The process of claim 1, wherein means are provided to allow customers in an additional step to non-sequentially proceed in a parking lot to a pick-up window when their order is ready.

9. The process of claim 1, wherein:

(A) the desired order pickup time is as soon as possible;

(B) the PTSL rules are further applied in step d) to: (a) determine if at least one menu option may be removed to make the provisional order pickup time earlier, (b) store at least one menu option so determined, if any, and (c) calculate the time potentially saved by removing each menu option so stored, if any; and (C) the feedback to the customer in step e) further comprises at least one menu option stored in part (B)(b), if any, coupled with the time potentially saved by that menu option, calculated in part (B)(c), if any.

10. The process of claim 1, wherein:

(A) at least the non-provisional input of the customer further comprises a request for delivery of the order and a delivery location;

(B) the data processing unit further obtains an estimated delivery duration to the delivery location;

(C) the estimated delivery duration is also provided to the customer in step j);

(D) in at least step m), the customer is a delivery driver picking up the order on behalf of the customer; and (E) a further step is: transmitting to the customer information that the order is out for delivery.

11. The process of claim 10, wherein the order is delivered by at least one drone, timing rules being applied by a data processing unit to determine at least one drone departure time.

12. The process of claim 11, wherein the customer is in a vehicle and the order is delivered by a drone to the customer while the vehicle is on the road, timing rules being applied by a data processing unit to determine when the customer is approaching within range of drone delivery, and providing information such that the drone is dispatched to deliver the order.

13. A system, for reception, production, and non-sequential pickup of orders in a drive-in restaurant with a pick-up window, comprising: at least one data processing unit connected to at least one network configured to perform the following steps for multiple customers:

a) generate and transmit at least one dataset through a network to at least one device or computer, the dataset comprising at least one of: (i) an interactive menu with ordering information, and (ii) information sufficient to construct such a menu by another computer or system;

b) receive at least one dataset comprising provisional input from a customer, the provisional input comprising: (i) menu selections and (ii) desired order pickup time;

c) obtain at least one dataset comprising a set of production timing and slip logic (PTSL) rules for generating a dynamic position in a queue as a function of PTSL inputs comprising: (i) current order details, (ii) a current order queue, and (iii) configurable variables comprising: staff production quantity, staff production skill level, make time per menu item, and duplicate item time reducer(s);

d) apply the PTSL rules to calculate a provisional order pickup time, where step c) input (i) (current order details, of the PTSL inputs) comprises at least some of the provisional input from the customer;

e) generate and transmit at least one dataset comprising feedback to the customer, the feedback comprising the provisional order pickup time;

f) dynamically repeat at least some of steps a)-e) as necessary as the customer updates the provisional input;

g) accept at least one dataset comprising non-provisional input of the customer as an order;

h) apply the PTSL rules to: (1) generate an order fire time and (2) generate and transmit at least one dataset sufficient to assign the order a dynamic position, as in step (c), in a production queue, where current order details comprise at least some details of the order accepted from the customer in step g);

i) generate a promised order pickup time from values comprising: (i) the dynamic position of the order in the production queue and (ii) the order fire time;

j) generate and transmit at least one dataset comprising the promised order pickup time such that the customer receives the promised order pickup time;

k) generate and transmit at least one dataset sufficient to update the dynamic position in the production queue, if necessary, when at least one event from a list of events occurs, while preserving the promised order pickup time, by applying at least a subset of the PTSL rules as in step h)(2), as necessary, the list of events comprising: update of production status of an order in the production queue, and insertion of a new order into the production queue;

l) generate and transmit at least one dataset, comprising selected information regarding the order, to production staff such that production staff receive the order on at least one display device according to the dynamic position of the order in the production queue;

m) generate and transmit at least one dataset such that the customer receives a notice that the order is ready.

14. The system of claim 13, wherein:

(A) the desired order pickup time is as soon as possible;

(B) the PTSL rules are further applied in step d) to: (a) determine if at least one menu option may be removed to make the provisional order pickup time earlier, (b) store at least one menu option so determined, if any, and (c) calculate the time potentially saved by removing each menu option so stored, if any; and (C) the feedback to the customer in step e) further comprises at least one menu option stored in part (B)(b), if any, coupled with the time potentially saved by that menu option, calculated in part (B)(c), if any.

15. The system of claim 13, wherein:

(A) at least the non-provisional input of the customer further comprises a request for delivery of the order and a delivery location;

(B) the system further obtains an estimated delivery duration to the delivery location;

(C) the dataset in step j) further comprises estimated delivery duration, and that dataset is generated and transmitted such that the customer also receives an estimated delivery time;

(D) in at least step m), the customer is a delivery driver picking up the order on behalf of the customer; and (E) a further step is: generate and transmit at least one dataset such that the customer receives a notice that the order is out for delivery.

16. The system of claim 13, wherein the order is delivered by at least one drone, timing rules being applied by a data processing unit to determine at least one drone departure time.

17. The system of claim 16, wherein the customer is in a vehicle and the order is delivered by a drone to the customer while the vehicle is on the road, timing rules being applied by a data processing unit to determine when the customer is approaching within range of drone delivery, and providing information such that the drone is dispatched to deliver the order.

18. At least one non-transient computer readable medium providing program instructions for causing a computer to perform a method for reception, production, and non-sequential pickup of orders in a drive-in restaurant with a pick-up window, the method comprising:

a) generating and transmitting at least one dataset comprising at least one of: (i) an interactive menu with ordering information, and (ii) information sufficient to construct such a menu by another computer or system;

b) receiving at least one dataset comprising provisional input from the customer, the provisional input comprising: (i) menu selections and (ii) desired order pickup time;

c) obtaining at least one dataset comprising a set of production timing and slip logic (PTSL) rules for generating a dynamic position in a queue as a function of PTSL inputs comprising: (i) current order details, (ii) a current order queue, and (iii) configurable variables comprising: staff production quantity, staff production skill level, make time per menu item, and duplicate item time reducer(s);

d) applying the PTSL rules to calculate a provisional order pickup time, where step c) input (i) (current order details, of the PTSL inputs) comprises at least some of the provisional input from the customer;

e) generating and transmitting at least one dataset comprising feedback to the customer, the feedback comprising the provisional order pickup time;

f) dynamically repeating at least some of steps a)-e) as necessary as the customer updates the provisional input;

g) accepting at least one dataset comprising non-provisional input of the customer as an order;

h) applying the PTSL rules to: (1) generate an order fire time and (2) generate and transmit at least one dataset sufficient to assign the order a dynamic position, as in step (c), in a production queue, where current order details comprise at least some details of the order accepted from the customer in step g);

i) generating a promised order pickup time from values comprising: (i) the dynamic position of the order in the production queue and (ii) the order fire time;

j) generating and transmitting at least one dataset comprising the promised order pickup time such that the customer receives the promised order pickup time;

k) generating and transmitting at least one dataset sufficient to update the dynamic position in the production queue, if necessary, when at least one event from a list of events occurs, while preserving the promised order pickup time, by applying at least a subset of the PTSL rules as in step h)(2), as necessary, the list of events comprising: update of production status of an order in the production queue, and insertion of a new order into the production queue;

l) generating and transmitting at least one dataset, comprising selected information regarding the order, to production staff such that production staff receive the order on at least one display device according to the dynamic position of the order in the production queue;

m) generating and transmitting at least one dataset such that the customer receives a notice that the order is ready.

19. The computer-readable medium of claim 18, wherein:

(A) the desired order pickup time is as soon as possible;

(B) the PTSL rules are further applied in step d) to: (a) determine if at least one menu option may be removed to make the provisional order pickup time earlier, (b) store at least one menu option so determined, if any, and (c) calculate the time potentially saved by removing each menu option so stored, if any; and (C) the feedback to the customer in step e) further comprises at least one menu option stored in part (B)(b), if any, coupled with the time potentially saved by that menu option, calculated in part (B)(c), if any.

20. The computer-readable medium of claim 18, wherein:

(A) at least the non-provisional input of the customer further comprises a request for delivery of the order and a delivery location;

(B) the computer is further caused to obtain an estimated delivery duration to the delivery location;

(C) the dataset in step j) further comprises estimated delivery duration, and that dataset is generated and transmitted such that the customer also receives an estimated delivery time;

(D) in at least step m), the customer is a delivery driver picking up the order on behalf of the customer; and (E) a further step is: generate and transmit at least one dataset such that the customer receives a notice that the order is out for delivery.

21. The computer-readable medium of claim 18, wherein the order is delivered by at least one drone, timing rules being applied by a data processing unit to determine at least one drone departure time.

* * * * *